US012590595B2

(12) United States Patent
Bueter

(10) Patent No.: US 12,590,595 B2
(45) Date of Patent: Mar. 31, 2026

(54) WORKING CYLINDER

(71) Applicant: BÜMACH ENGINEERING INTERNATIONAL B. V., Ta Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/855,428

(22) PCT Filed: Mar. 24, 2023

(86) PCT No.: PCT/DE2023/000019

§ 371 (c)(1),
(2) Date: Oct. 9, 2024

(87) PCT Pub. No.: WO2023/198234

PCT Pub. Date: Oct. 19, 2023

(65) Prior Publication Data

US 2025/0237240 A1 Jul. 24, 2025

(30) Foreign Application Priority Data

Apr. 11, 2022 (DE) ..................... 20 2022 000 912.7

(51) Int. Cl.
*F15B 15/14* (2006.01)
*F15B 15/20* (2006.01)

(52) U.S. Cl.
CPC .......... *F15B 15/1428* (2013.01); *F15B 15/20* (2013.01)

(58) Field of Classification Search
CPC ............ F16F 9/54; F16F 9/56; F15B 2215/30
See application file for complete search history.

(56) References Cited

U.S. PATENT DOCUMENTS 4,944,705 A * 7/1990 Kashima ............... F16F 9/0272 188/300
5,364,201 A * 11/1994 LaBarre .................. F16C 11/10 403/321
6,102,606 A * 8/2000 Muller .................. F16F 9/3207 403/375

(Continued)

FOREIGN PATENT DOCUMENTS

CN 207093748 U 3/2018
DE 102008009898 A1 5/2009

(Continued)

*Primary Examiner* — Thomas E Lazo
(74) *Attorney, Agent, or Firm* — Laurence A. Greenberg; Werner H. Stemer; Ralph E. Locher

(57) ABSTRACT

A working cylinder has a cylinder with a cylinder tube, a first closure part arranged on a first cylinder tube end and a second closure part arranged on a second cylinder tube end, The cylinder tube and the closure parts define a cylinder interior. A piston unit defines at least one working space in the cylinder interior and passes through the first closure part and has an outer end portion. The working cylinder has a corrosion resistant rod-side threaded coupling module with a threaded portion and a weld-on portion. The threaded portion is for coupling to a device to be actuated. The coupling module is welded by the weld-on portion to the outer end portion of the piston unit by a weld seam. The threaded portion is arranged on a longitudinal axis of the piston unit.

8 Claims, 2 Drawing Sheets

(56) References Cited

U.S. PATENT DOCUMENTS

| | | | | |
|---|---|---|---|---|
| 6,347,573 | B1 * | 2/2002 | Henkel ................. | F16F 9/0245<br>92/13.51 |
| 9,360,077 | B2 * | 6/2016 | Bochen ..................... | F16F 9/54 |
| 9,394,738 | B2 | 7/2016 | Bochen et al. | |
| 2005/0109570 | A1 | 5/2005 | Muller | |
| 2021/0156471 | A1 | 5/2021 | Lee et al. | |

FOREIGN PATENT DOCUMENTS

| | | | |
|---|---|---|---|
| DE | 102010025693 | A1 | 1/2012 |
| DE | 102012201174 | A1 | 8/2013 |
| DE | 202020000098 | U1 | 5/2021 |
| EP | 1555454 | A1 | 7/2005 |
| EP | 2807398 | B1 | 1/2018 |
| WO | 2016037628 | A1 | 3/2016 |

* cited by examiner

WORKING CYLINDER

FIELD AND BACKGROUND OF THE INVENTION

The invention relates to a working cylinder with coupling sections for a screw coupling to a device to be actuated.

It is known from the state of the art to screw working cylinders to devices to be actuated by means of fastening threads and thus to couple them. This can be done directly or indirectly via connection modules such as ball joints, fork eyes, and the like.

Such fastening threads are produced by machining both at the piston rods and at the bottom closure part. The disadvantage of machining a fastening thread at a piston rod is, for example, that the previously applied valuable chrome plating is removed and thus the corrosion protection is destroyed. Another disadvantage is the fact that spanner flats, which are intended for the application of a torque or for counter-holding during screwing, require a high level of material removal with an undesirable weakening of the cross-section is caused.

Subsequent coating to provide corrosion protection is either impossible or very difficult to realize.

Disadvantageously, the unprotected fastening threads are subject to a high level of corrosion and start to rust very quickly. As a countermeasure, it is known to apply a thick layer of grease to reduce corrosive influences, especially during sea transport. Such a layer of grease must be renewed after assembly. In addition to the unsatisfactory corrosion protection effect, the environmental impact and the high manual labour input are also disadvantageous.

SUMMARY OF THE INVENTION

The task of the invention is to provide a thread-coupleable working cylinder which is reliably protected against corrosion and can be manufactured with reduced material consumption and expenditure of time.

The task is solved by the features specified in the independent claims. Preferred further embodiments result from the sub-claims.

The working cylinder according to the invention comprises a cylinder and a piston unit as its basic elements and is characterized by a special threaded coupling module.

The cylinder of the working cylinder according to the invention comprises a cylinder tube, a first closure part and a second closure part in a manner known per se.

The cylinder tube has two opposite cylinder tube ends. Hereinafter, the two opposing cylinder tube ends are referred to as the first cylinder tube end and the second cylinder tube end and collectively as the cylinder tube ends.

The first closure part is arranged at the first cylinder tube end and the second closure part is arranged at the second cylinder tube end. Hereinafter, the first closure part and the second closure part are also collectively referred to as the closure parts. The cylinder tube and the closure parts arranged at it form a cylinder interior. For this purpose, the two closure parts are designed such that they are connected to the respective cylinder tube ends in a pressure-tight manner. These connections are preferably made by laser-welding the two closure parts with the cylinder tube along the circumferential common contact surface.

The piston unit forms at least one working chamber in the cylinder interior. The piston unit is preferably designed as an assembly consisting of a piston and a piston rod, wherein the piston rod passes in a sliding manner through at least one of the closure parts, which is then a guide closure part. Though, the piston unit can also be provided, for example, as a plunger piston or as a piston unit of a double-rod cylinder. However, the working cylinder according to the invention can also be of other types, it can be, in particular, a differential working cylinder or a pull cylinder. Preferably, it is a hydraulic cylinder, without being restricted to this type.

The piston unit has an outer end section. The outer end section is understood to be the distal head section of the piston unit, preferably of the piston rod, which is located outside the cylinder interior. In the case of a plunger cylinder, this is the distal head of the plunger piston.

The working cylinder according to the invention is also characterized by a specially designed coupling section (portion).

For the purposes of this invention, the coupling section is understood to be the part of the working cylinder which is connected to a device to be actuated, for example an excavator arm, and via which the forces provided by the working cylinder are transmitted or the forces emanating from the device to be actuated are absorbed. The device to be actuated itself is not part of the working cylinder according to the invention. It merely represents the functional context of the working cylinder according to the invention. Normally, two opposing coupling sections are arranged at the working cylinder, wherein at least one coupling section is designed according to the invention.

For this reason, the working cylinder according to the invention has a threaded coupling module on the rod side.

The rod-side threaded coupling module is corrosion-resistant according to the invention and is preferably a galvanized component or a stainless steel component, in particular a V2A or V4A component.

According to the invention, the threaded coupling module has a threaded section and a weld-on section. Preferably, the rod-side threaded coupling module is designed in the form of a screw, wherein the threaded shank forms the threaded section and the screw head forms the weld-on section. Hereinafter, the thread of the threaded section is also referred to as the fastening thread or coupling thread.

The threaded section is designed to be coupled to the device to be actuated and, as intended, is screwed to a mating thread of said device. A metric thread is preferred.

The weld-on section follows the threaded section in a longitudinal extension and, according to the invention, it is welded to the outer end section of the piston unit by means of a weld seam. Preferably, the welding partner of the weld-on section is the outer head section of a piston rod. However, in the meaning of this invention, the designation as a rod-side threaded coupling module is also used if the outer end section does not refer to a piston rod in the narrower sense but, for example, to a plunger piston of a plunger cylinder.

The weld seam is preferably formed as a circumferential laser weld seam. Thus, a welded joint can be advantageously produced which connects the corrosion-resistant surface coating of the piston rod to the corrosion-resistantly designed rod-side threaded coupling module in such a way that an uninterrupted corrosion-resistant surface can be provided.

According to the present invention, a double rod cylinder preferably has two rod-side threaded coupling modules, each of which being welded to one of the two outer end sections of the piston rod by means of a weld seam.

According to a further aspect of the invention, the working cylinder according to the further independent claim is characterized by a threaded coupling module on the base side.

The basic structure of the working cylinder with a base-side threaded coupling module corresponds to the basic structure of the working cylinder with a rod-side threaded coupling module so that the contents of the description relating thereto apply accordingly, unless the following special features apply.

The first closure part of the cylinder of the working cylinder with base-side threaded coupling module is exclusively designed as a guide closure part. The second closure part is a base closure part.

Here, the characteristic feature is the threaded coupling module on the base side.

The base-side threaded coupling module is principally designed like the rod-side threaded coupling module. Therefore, the description of the threaded coupling module on the rod side also applies to the threaded coupling module on the base side accordingly, taking into account the special features.

The base-side threaded coupling module and the rod-side threaded coupling module are each also referred to in abbreviated forms as the threaded coupling module and collectively as the threaded coupling modules.

The base-side threaded coupling module is also corrosion-resistant and comprises a threaded section and a weld-on section. In the case of the base-side threaded coupling module, the weld-on section is welded to an outer axial surface of the base closure part by means of a weld seam. The outer axial surface is the base-side outward-oriented cover surface of the base closure part. Normally, this is a circular surface of a cylindrical base closure part.

In addition, the threaded section of the threaded coupling modules is arranged in the longitudinal axis of the working cylinder, and, in particular, the threaded section of the rod-side threaded coupling module is arranged in the longitudinal axis of the piston unit and the threaded section of the base-side threaded coupling module is arranged in the longitudinal axis of the cylinder.

Thus, a working cylinder can have either one or two rod-side threaded coupling modules, one base-side threaded coupling module or one rod-side threaded coupling module and one base-side threaded coupling module.

The solution according to the invention has the following advantages in particular, both in the design of the threaded coupling module as a rod-side threaded coupling module and in the design as a base-side threaded coupling module.

Surprisingly, a very simple and at the same time particularly effective solution was found to provide reliable corrosion protection for the fastening threads. In contrast to the state of the art, this corrosion protection is achieved without additional measures and without damaging environmental influences.

The production of a working cylinder according to the invention is also particularly cost-effective and time-saving. Instead of the time-consuming machining of a fastening thread, all that is required is laser welding, which generally takes maximally two seconds.

Another advantage, particularly in the case of a rod-side threaded coupling module, is given by material savings made possible by the fact that the length of the cost-intensive piston rod can be reduced by the section no longer required for a fastening thread to be produced directly on the piston rod by machining. This length section is advantageously replaced by the threaded coupling module to be welded on.

Another advantage is the high material quality and thus a high mechanical load-bearing capacity of the welded-on threaded coupling modules according to the invention, especially if these are designed as standardized screws.

According to an advantageous further development, the rod-side or the base-side threaded coupling module is designed as a cap screw.

The head of the cap screw forms the weld-on section and the threaded shank of the cap screw forms the threaded section.

Advantageously, the head of the cap screw provides a weld-on section with an enlarged surface compared to the cross-sectional surface of the threaded section. Furthermore, according to this further development, the threaded coupling module can advantageously be provided by an inexpensive component that is directly available on the market. In particular, it is advantageous that a high degree of standardization and quality assurance, for example expressed in strength classes, is available and can be utilized. Preferably, screws of strength class 8.8 are used, which are, in addition, very suitable for forming the weld seam as a laser weld seam.

According to a further advantageous embodiment, the rod-side threaded coupling module is designed as a hexagon head screw.

In addition to the advantages of a cap screw described above, hexagon head screws have the particular advantage that the hexagon head remains laterally accessible as a screw drive after the connection to the outer end section of the piston unit has been produced by means of the weld seam. Thus, a spanner flat is advantageously directly available as a drive for screwing the rod-side threaded coupling module to the device to be actuated without any further additional measures.

According to another advantageous further development, the working cylinder according to the invention is characterized in that the base-side threaded coupling module is designed as a cylinder head screw and the weld-on section is designed as a cylindrical screw head, in that the second closure part, which is provided as a base closure part, has a cylindrical bore hole on an outer axial surface, in that the cylindrical screw head is radially received in a form-fitting manner by the cylindrical bore hole, and in that the weld seam is designed as an axial ring weld seam According to this advantageous further development, a bore hole in the form of a blind hole can be drilled into the outer axial surface by machining during the production of the base closure part. The inner diameter of this bore hole is matched to the outer diameter of the cylindrical screw head in such a way that there is preferably an exact fit or interference fit. The base-side threaded coupling module, which is designed as a cylinder head screw here, is then inserted axially with the screw head into the bore hole and is axially fixed there in the distal direction with the exception of the linear degree of freedom. An axially orientated laser ring weld seam is then produced, preferably by means of laser welding, to provide a positive substance connection between the threaded coupling module and the base closure part.

This further development simplifies production in a particularly advantageous manner, as the threaded coupling module and the base closure part can be precisely aligned one to the other before welding and fixed by means of an interference fit.

According to another further development, the working cylinder is characterized in that the rod-side threaded coupling module or the base-side threaded coupling module is designed as a galvanized screw or a stainless steel screw.

Galvanized screws and stainless steel screws offer high corrosion resistance and are available in a high process-reliable quality at low cost. Stainless steel screws are understood to be screws made of stainless steel, for example with material number 4301. A continuous corrosion-resistant surface is thus advantageously provided, particularly when the weld seam is produced as a laser weld seam.

According to another advantageous further development, the threaded coupling module has a protective covering layer.

In addition to the use of corrosion-protected screws or threaded pins as weld-on nozzles, this further development also provides for other threaded coupling modules covered with protective layers to be connected to the base closure part or to the piston unit by laser welding. Such a protective covering layer can be, for example, a chromium or nickel layer.

The invention is explained as an exemplary embodiment in more detail by means of the following figures.

BRIEF DESCRIPTION OF THE FIGURES

The same reference numerals in the various figures refer to the same features or components. The reference numerals are also used in the description, if they are not shown in the relevant figure.

DETAILED DESCRIPTION OF THE INVENTION

Figure 1:
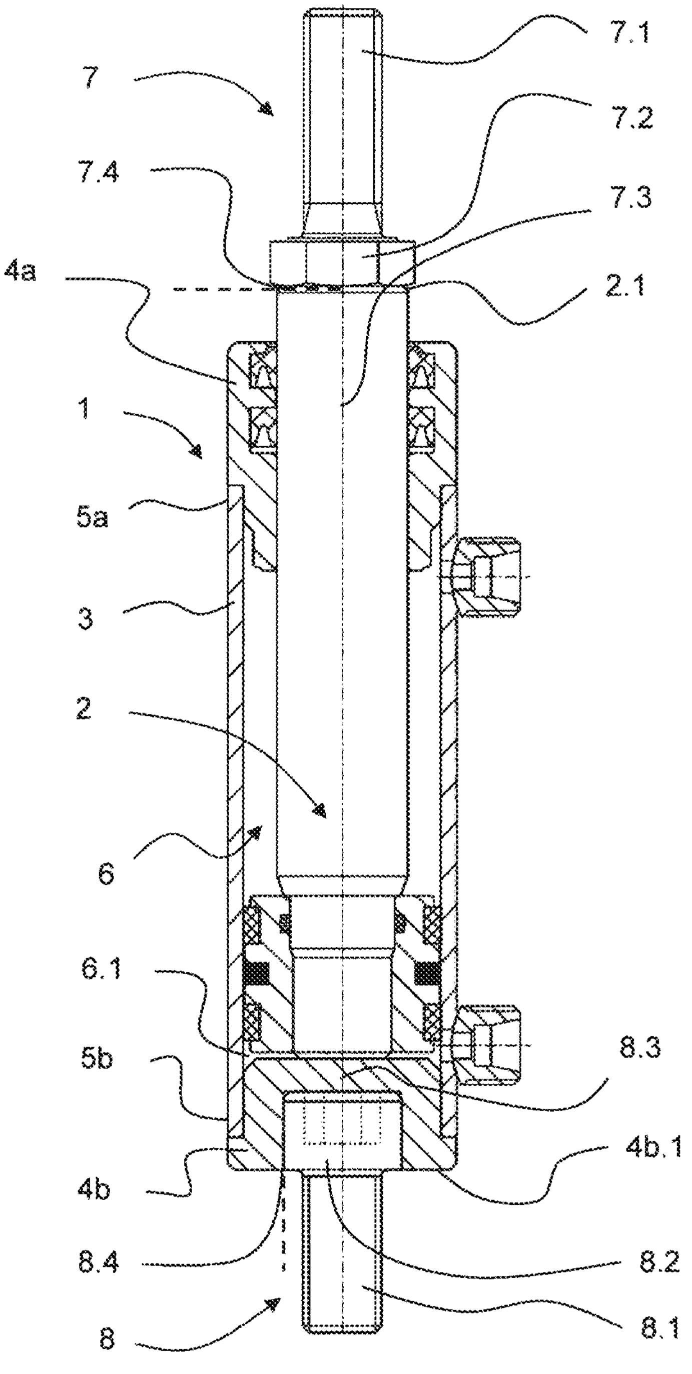
FIG. 1 Working cylinder with threaded coupling modules as cap screws (sectional view)

FIG. 1 shows a working cylinder in an exemplary embodiment in which the threaded coupling modules 7, 8 are designed as cap screws.

The basic structure of the working cylinder comprises the cylinder 1 and the piston unit 2.

The cylinder 1 has a cylinder tube 3 with a first cylinder tube end 5*a* and a second cylinder tube end 5*b*. The first closure part 4*a*, here being a guide closure part, which is provided at the first cylinder tube end 5*a*, and the second closure part 4*b*, here being a base closure part, which is provided at the second cylinder tube end, are arranged in a sealing manner and by means of a laser weld seam so that the closure parts 4*a*, 4*b* and the cylinder tube 3 enclose a cylinder interior 6.

In the exemplary embodiment, the piston unit 2 is designed in two parts comprising a piston and a piston rod (each without a reference numeral) which are connected to each other. The piston unit 2 passes through the first closure part 4*a* with the piston rod and, at the same time, it forms the at least one working chamber 6.1 in the cylinder interior 6. In the exemplary embodiment, the reference numeral 6.1 indicates the piston chamber. The piston rod chamber is provided as a further working chamber (without reference numeral) in the exemplary embodiment The rod-side threaded coupling module 7 is arranged at the outer end section 2.1 of the piston unit 2, in this case the front end of the piston rod. It is designed as a hexagon head screw so that the threaded section 7.1 of the threaded coupling module 7 is formed by the shank of the screw, and the weld-on section 7.2 of the threaded coupling module 7 is formed by the hexagon head. Thus, the weld-on section 7.2 has an axial front face that is opposite the axial front face of the outer end section 2.1. Both front faces are full-faced welded by the weld seam 7.4 as a laser weld seam, wherein the weld seam 7.4 is arranged radially. The radial arrangement is emphasized by the dashed line. After welding, the spanner flats of the hexagon head are advantageously available for assembly by screwing the threaded section 7.1 to a device to be actuated. For the purpose of an optimum force transmission, the longitudinal axis of the threaded section 7.1 lies on the longitudinal axis 7.3 of the piston unit 2.

Furthermore, the base-side threaded coupling module 8, which is designed as a cylinder head screw, is arranged on the outer axial surface 4*b*.1 of the second closure part 4*b*. The second closure part 4*b* has a bore hole on the outer axial surface 4*b*.1, and the inner diameter of said bore hole corresponds to the outer diameter of the cylindrical head of the cylinder head screw and fittingly receives the head of the cylinder head screw. Thus, the head of the cylinder head screw forms the weld-on section 8.2 and its threaded shank forms the threaded section 8.1. Here, the welding seam is also designed as a laser weld seam, wherein the weld seam 8.4 is introduced axially, highlighted by the dashed line. Thus, the weld seam 8.4 is present as a cylindrical jacket surface on the contact surface between the bore hole and the weld-on section 8.2, formed by the screw head. Here, the longitudinal axis of the threaded section 8.1 also lies on the longitudinal axis 8.3 of the cylinder 1 for the purpose of optimum force transmission.

Figure 2:
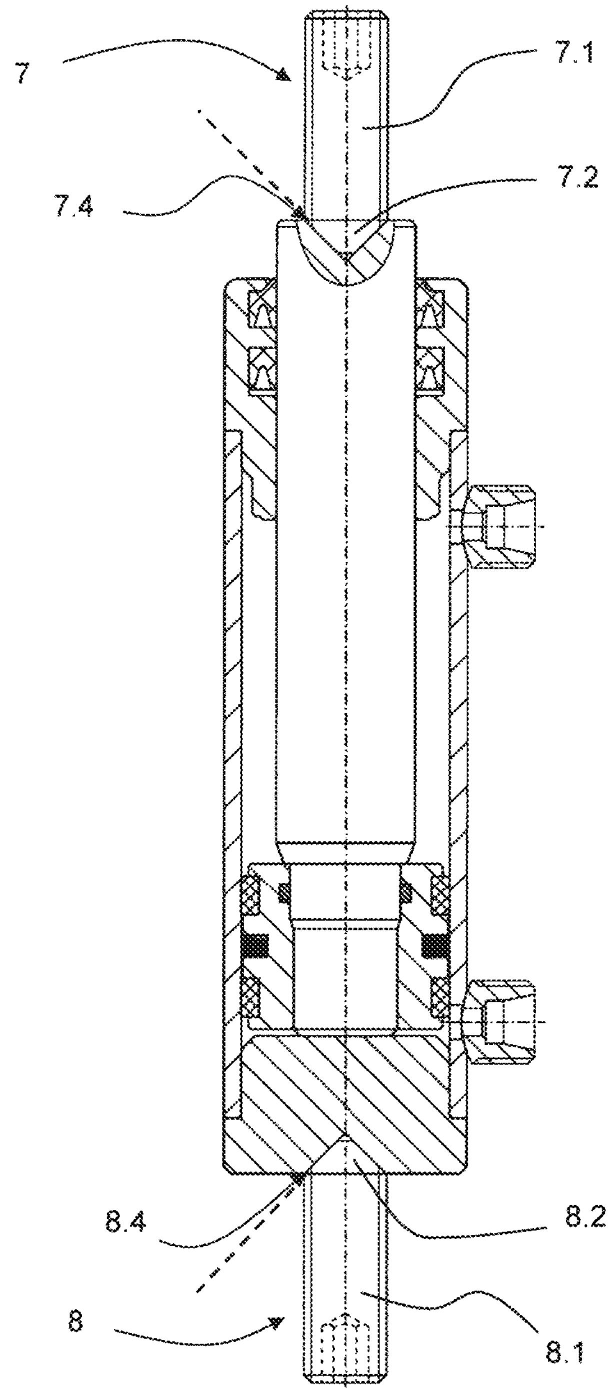
FIG. 2 Working cylinder with threaded coupling modules as stud bolts (sectional view)

FIG. 2 shows a further exemplary embodiment, the basic structure of which corresponds to that of the exemplary embodiment shown in FIG. 1.

However, according to FIG. 2, the threaded coupling modules 7, 8 are designed as stud bolts with a conical end that forms the weld-on section 7.2, 8.2 in each case.

Like the second closure part 4*b* on its outer axial surface 4*b*.1, the piston unit 2 has a recess at its outer end section 2.1, the angle of inclination of which corresponds to the angle of inclination of the conical end of the stud bolts.

The weld seam 7.4, 8.4, the angle of inclination of which is highlighted by the respective dashed line, is arranged on the corresponding conical surfaces.

REFERENCE NUMERALS

1 Cylinder
2 Piston unit
2.1 Outer end section
3 Cylinder tube
4*a* First closure part
4*b* Second closure part
4*b*.1 Outer axial surface
5*a* First cylinder tube end
5*b* Second cylinder tube end
6 Cylinder interior
6.1 Working chamber
7 Rod-side threaded coupling module
7.1 Threaded section of the rod-side threaded coupling module
7.2 Weld-on section of the rod-side threaded coupling module
7.3 Longitudinal axis of the piston unit
7.4 Weld seam of the rod-side threaded coupling module
8 Base-side threaded coupling module
8.1 Threaded section of the base-side threaded coupling module

8.2 Weld-on section of the base-side threaded coupling module

8.3 Longitudinal axis of the cylinder

8.4 Weld seam of the base-side threaded coupling module

The invention claimed is:

1. A working cylinder, comprising:

a cylinder having a cylinder tube, a first closure part and a second closure part defining a cylinder interior, said cylinder tube having a first cylinder tube end and a second cylinder tube end, said first closure part being arranged at said first cylinder tube end and said second closure part being arranged at said second cylinder tube end;

a piston unit having a longitudinal axis and defining a working chamber in said cylinder interior, said piston unit passing through the first closure part in a sliding manner and having an outer end section;

a corrosion-resistant rod-side threaded coupling module being a hexagon head screw having a threaded section and a weld-on section, said threaded section being constructed for being coupled to a device to be actuated, said rod-side threaded coupling module being welded with said weld-on section to said outer end section of the piston unit by a weld seam, said threaded section being arranged on the longitudinal axis of the piston unit.

2. The working cylinder according to claim 1 wherein said rod-side threaded coupling module is constructed as a cap screw.

3. The working cylinder according to claim 1, wherein said rod-side threaded coupling module is a galvanized screw or a stainless steel screw.

4. The working cylinder according to claim 1 wherein said rod-side threaded coupling module is provided with a protective covering layer.

5. A working cylinder, comprising:

a cylinder having a cylinder tube, a first closure part and a second closure part defining a cylinder interior, said cylinder tube having a first cylinder tube end and a second cylinder tube end, said first closure part being arranged at said first cylinder tube end and being constructed as a guide closure part and said second closure part being arranged at said second cylinder tube end and being constructed as a base closure part;

a piston unit defining a working chamber in said cylinder interior, said piston unit passing through the first closure part in a sliding manner and having an outer end section;

a corrosion-resistant base-side threaded coupling module constructed as a cylindrical head screw having a threaded section and a weld-on section, said weld-on section constructed as a cylindrical screw head, said threaded section being constructed for being coupled to a device to be actuated, said base-side threaded coupling module being welded with said weld-on section to an outer axial surface of the second closure part by a weld seam, said threaded section being arranged along a longitudinal axis of the cylinder, said second closure part having a cylindrical bore hole on said outer axial surface, said cylindrical screw head being radially received in a form-fitting manner by the cylindrical bore hole, and said weld seam being an axial ring weld seam.

6. The working cylinder according to claim 5, wherein said base-side threaded coupling module is constructed as a cap screw.

7. The working cylinder according to claim 5, wherein said base-side threaded coupling module is constructed as a galvanized screw or as a stainless steel screw.

8. The working cylinder according to claim 5, wherein said base-side threaded coupling module is provided with a protective covering layer.

* * * * *